Dec. 8, 1953     E. LAMMERZ ET AL     2,661,632
TWIN MULTIPLE SPEED TRANSMISSION
Filed March 8, 1951                                             2 Sheets-Sheet 1
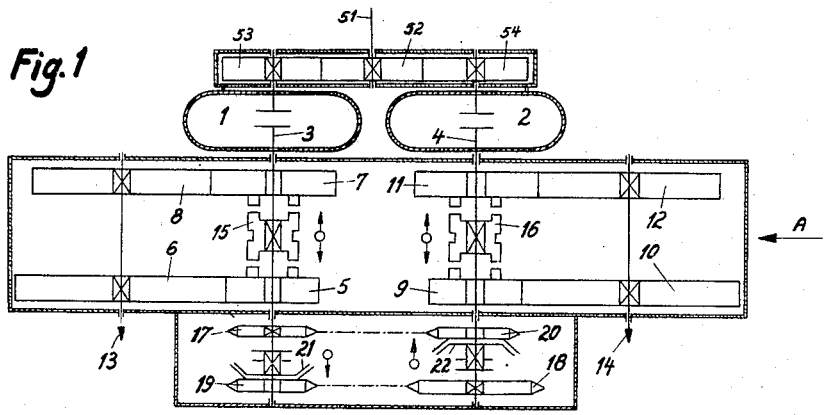
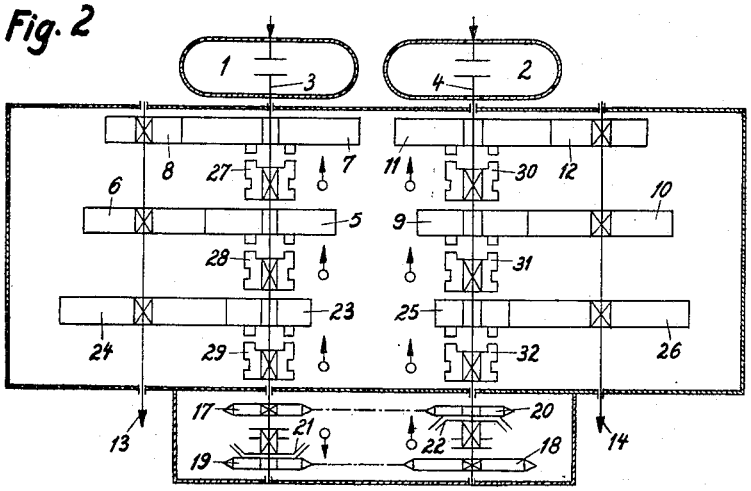
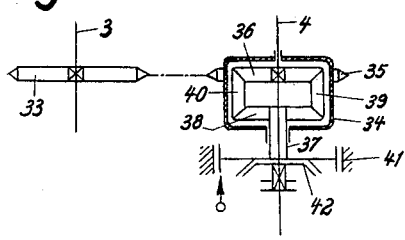
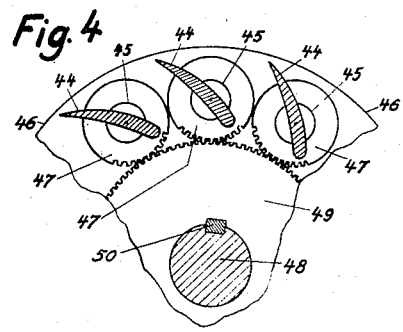
Inventors
ERNST LAMMERZ
HEINRICH HERMANN
by    Toulmin & Toulmin
Attorneys Dec. 8, 1953  E. LAMMERZ ET AL  2,661,632
TWIN MULTIPLE SPEED TRANSMISSION
Filed March 8, 1951  2 Sheets-Sheet 2

Inventors
ERNST LAMMERZ
HEINRICH HERMANN
by Toulmin & Toulmin
Attorneys

Patented Dec. 8, 1953

2,661,632

UNITED STATES PATENT OFFICE 2,661,632

TWIN MULTIPLE SPEED TRANSMISSION

Ernst Lammerz, Essen, and Heinrich Herrmann, Kettwig, Germany, assignors to Fried. Krupp Lokomotivfabrik, Essen, Germany, Application March 8, 1951, Serial No. 214,458

Claims priority, application Germany March 29, 1950

11 Claims. (Cl. 74—665)

The present invention relates to multiple speed transmissions, i. e., two and more speed transmissions, and is especially directed to such multiple speed transmissions in connection with a hydraulic double or twin transmission.

Arrangements of this type, as heretofore known, require a great number of synchronizing devices, the number of which equals the product of the number of speed steps times the number of individual transmission units. Consequently, such arrangements are relatively complicated and expensive, and become more complicated and more expensive with each additional speed and transmission unit.

Therefore, it is an object of the present invention to provide a materially simplified arrangement of the above-mentioned type.

A further object of this invention consists in the provision of a multiple speed transmission in connection with a multiple hydraulic transmission in which the number of synchronizing devices is materially reduced with regard to similar arrangements heretofore known.

It is a still further object of this invention to provide a mechanical multiple speed transmission in connection with a hydraulic double or twin transmission, in which only two synchronizing devices will suffice to allow a highly satisfactory and diversified operation of the arrangement.

It is also an object of this invention to provide a mechanical multiple speed transmission in connection with a hydraulic double or twin transmission, particularly for driving rail vehicles with individual axle drive, or individual drive of axle groups, in which the synchronization for the speed shifting operation may be effected by varying the speed of rotation of the output shaft of one or the other hydraulic transmission respectively, without having to interrupt the power transmission from both of said hydraulic transmissions.

These and other objects and advantages of the invention will appear more clearly from the following specification in connection with the accompanying drawings, in which:

Fig. 1 diagrammatically illustrates a shiftable two speed transmission according to the present invention.

Fig. 2 is a diagrammatic illustration of a shiftable three speed transmission according to the present invention.

Fig. 3 represents a special construction for use in connection with a two or more speed transmission of the present invention.

Fig. 4 diagrammatically illustrates, partly in section, a top view of a detail forming part of the shiftable transmission according to this invention.

Figure 5:
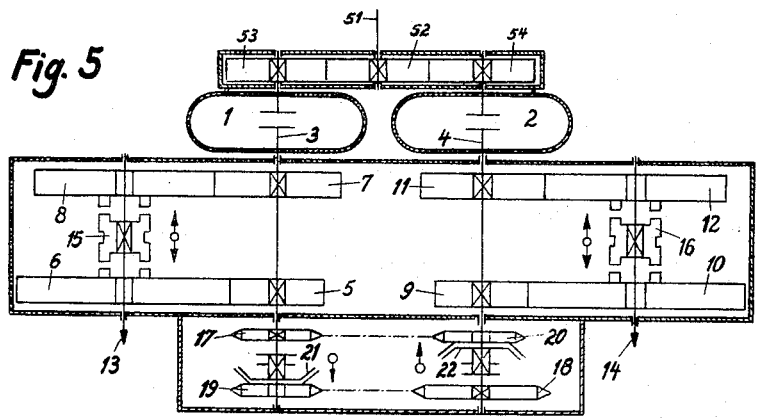

Fig. 5 diagrammatically illustrates another embodiment of a shiftable two speed transmission according to the present invention.

Figure 6:
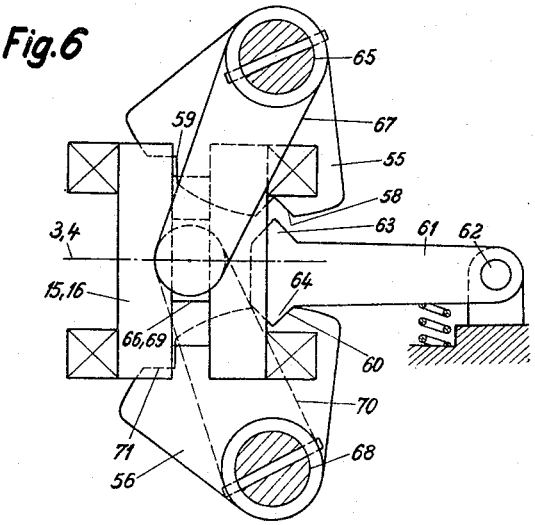

Fig. 6 diagrammatically illustrates, partly in section, a detail, shown in the direction of the arrow A in Fig. 1 of the present invention.

GENERAL ARRANGEMENT

In order to reduce the relatively great number of synchronizing devices heretofore necessary with arrangements comprising shiftable multiple speed transmissions in connection with a hydraulic double or twin transmission, according to the present invention there is arranged between the input and output shafts of each transmission assembly, a normal clutch adapted selectively to be made effective or ineffective for purposes of changing the speed. Furthermore, a special transmission is provided for selectively drivingly interconnecting the input shafts. This special transmission is provided with synchronizing devices and has transmission ratios corresponding to the respective speed step. The arrangement according to the invention requires only two synchronizing devices, even if a transmission with more than two speeds is involved.

In order to effect the synchronizing process when carrying out the first shifting arrangement, the output shaft of one hydraulic transmission has its speed of rotation increased or decreased by the output shaft of the other hydraulic transmission, while the synchronization for the second shifting operation is effected by causing the output shaft of one hydraulic transmission to increase or decrease the speed of rotation of the output shaft of said other hydraulic transmission. The arrangement is such that during the synchronization and shifting operation, the power transmission from at least one hydraulic transmission may be maintained.

STRUCTURAL ARRANGEMENT

Embodiment of Fig. 1

Referring now to the drawing in detail and to Figs. 1 and 4 thereof in particular, the structure shown therein comprises two hydraulic converters 1 and 2 which may be driven, for instance, by an internal combustion engine (not shown in the drawing). To this end, the crankshaft of the engine or an extension 51 thereof, has keyed thereto, a pinion 52 meshing with gears 53 and 54 which are keyed to the pump shafts of the converters 1 and 2 respectively. The axes of rotation of the crankshaft or extension 51 and of the pump shafts of the converters 1 and 2 are located in one and the same plane, and the pinion 52 and the gears 53 and 54 have the same dimensions. Each of the two converters may be equipped with adjustable pumping blades 44 (see Fig. 4), said pumping blades 44 being provided with pivots 45 which are rotatably journaled in the disc 46 of the pump wheel. Each of the pump blades 44 has a tooth segment 47 meshing with an adjusting gear 49 rigidly connected to the adjusting shaft 48, for instance, by means of a key 50. The turbine shafts 3 and 4 convey their power to the subsequent transmission which consists of four gears 5, 6, 7, 8 and 9, 10, 11, 12 respectively. The gears 5 and 6 and 9 and 10 are intended for the low speed, whereas, the gears 7 and 8 and 11 and 12 are intended for the fast speed. In this connection a speed step of 1:2 may be assumed. The two output shafts 13 and 14 lead, as indicated by the arrowheads, to individually driven axles or groups of axles (not shown in the drawing).

The gears 5 and 7, and similarly, the gears 9 and 11 are freely rotatably mounted on the turbine shafts 3 and 4 or extensions thereof. These gears are provided with jaws adapted selectively to be brought into engagement with adjacent jaws of clutches 15 and 16 respectively, each of which is provided with jaws on two opposite sides thereof. The clutches 15 and 16 are not rotatably connected to, but slidable on the shafts 3 and 4 respectively, and are mounted between the gears 5 and 7 and 9 and 11 respectively.

According to the present invention, the shaft 3 has mounted thereon, two sprocket wheels 17 and 19, of which the sprocket wheel 17 is rigidly connected to the shaft 3, whereas, the sprocket wheel 19 is freely rotatable on the shaft 3. Similarly, the shaft 4 has rigidly connected thereto, a sprocket wheel 18 and has freely rotatably mounted thereon, a sprocket wheel 20. As will be clear from the drawing, the sprocket wheel 17 rigidly connected to the shaft 3 is drivingly connected by means of a chain with the sprocket wheel 20 freely rotatable on shaft 4. In a corresponding manner, sprocket wheel 18 rigidly connected to shaft 4, is drivingly connected by means of a chain with the sprocket wheel 19 freely rotatable on shaft 3. Corresponding to the assumed speed step 1:2, the transmission from sprocket wheel 17 to sprocket wheel 20 will equal 1:1 and the transmission between sprocket wheel 18 and sprocket wheel 19 will equal 1:2. It is, of course, understood that instead of a chain and sprocket wheel drive, also regular gears may be provided, in which instance, the space between the gears on shafts 3 and 4 would be bridged by an intermediate gear or gear system. For synchronizing purposes, the freely rotatable sprocket wheel 19 may selectively be drivingly connected to or disconnected from the shaft 3 by means of a clutch 21 which is not nonrotatably connected to, but slidably mounted on the shaft 3. Similarly, a clutch 22 is drivingly connected not rotatably to, but slidably mounted on the shaft 4 for selectively effecting or interrupting driving connection between the shaft 4 and the sprocket wheel 20 freely rotatably mounted thereon.

*Operation*

It may be assumed that the vehicle equipped with the arrangement of Fig. 1 is at a standstill, and that the transmission has been shifted into the first speed, which means that the clutch sleeves 15 and 16 engage the clutches respectively rigidly connected to the gears 5 and 9. Furthermore, the two synchronizing clutches 21 and 22 are assumed to be in their ineffective positions. As soon as the converters 1 and 2 convey power to the shafts 3 and 4, the vehicle will move. As soon as the maximum speed has been obtained with the first speed, the power transmission from the converter 2 is interrupted in well known manner, for instance, by reducing the speed of rotation of the pumping wheel to its minimum speed of rotation or, in case of adjustable pumping blades, by closing said blades. Thereupon, the clutch sleeve 16 is disengaged from the jaws rigidly connected to the gear 9 and moved into its intermediate position shown in Fig. 1, while simultaneously the clutch 21 is made effective. In this way, the speed of rotation of the turbine shaft 4, assuming a speed step of 2:1, is reduced to half the speed of the shaft 3, thereby enabling engagement of the coupling sleeve 16 with the adjacent jaws of gear 11. While this clutching operation is effected, the clutch 21 is disengaged and the converter 2 again receives power either by increasing the speed of rotation of the pumping wheel, or by opening the adjustable pumping blades. Thereupon, the power transmission to the turbine shaft 3 is interrupted (up to this point this power transmission was effective), and the clutch sleeve 15 is disengaged from the jaws pertaining to the gear 5, whereupon the clutch sleeve 15 is brought into its intermediate or ineffective position. While this de-clutching operation is effected, the synchronizing clutch 22 is made effective so that the speed of the turbine shaft 3 through the chain drive with the sprocket wheel 17 is reduced to the speed of shaft 4. This makes it possible to bring the clutch sleeve 15 into engagement with the jaws of the gear 7 while clutch 22 is immediately disengaged when clutch sleeve 15 engages the respective jaws of gear 7. In this way, both transmissions are shifted to high speed and will drive the corresponding vehicle axles accordingly as soon as the converter 1 again conveys power to the shaft 3.

If down-shifting of the arrangement from the second speed into the first speed is desired, the shifting operation is carried out similar to, but in reverse manner, as the shifting-up operation. In other words, power transmission from the converter 1 is interrupted first and the clutch 21 is made effective, so that the clutch sleeve 15 can be moved away from gear 7 and into engagement with the jaws of the gear 5. Only then, after the converter 1 again transmits power, the power transmission from the converter 2 is interrupted, and by means of the clutch 22 synchronized speed of the two turbine shafts is obtained with 1:1, so that the shifting of the clutch sleeve 16 away from gear 11 and into engagement with the jaws of gear 9 can be effected.

In addition to the fact that only two synchronizing devices are required in connection with the arrangement of the present invention, the arrangement has the further advantage that if both converters 1 and 2 are equipped with adjustable blades, these two converters may be driven by one and the same motor without requiring that the synchronizing devices have to have a very large transmission moment; in other words, the synchronizing clutches have, for instance, to be dimensioned only for 20 to 30% of the greatest transmission moments of the respective turbine shaft.

The arrangement according to the present invention also makes sure that when a speed shifting operation is effected, no complete interruption of the pulling power will occur, which fact is of particular importance in connection with locomotives and diesel locomotives. At any rate, it is made sure that at least 50% of the power is transmitted at all times. This value may still be increased if the driving motor during the shifting operation is temporarily brought up to a speed of rotation which is 10% higher than the normal speed, so that the power will increase from 50% to about 65%, thereby reducing the transmission of power by a maximum of 35%.

If the speed of the pumping wheel is increased to such an extent that the pumping blades in adjustable arrangement are not yet fully opened at high speed of the turbine shaft, the decrease in the transmission of power during the shifting operation may be reduced. If, for instance, a vehicle comprises two of the units described above, and if the shifting operation of these two units is effected one after another while the respective unit which at that time is not being shifted, is temporarily overloaded by 10%, the transmission of power will be decreased by barely 12 to 13% which, during the running of the train, is practically unnoticeable, so that the actual subsequently effected shifting operations may extend over a somewhat longer time. It should also be noted that the shifting operation of the coupling sleeves 15 and 16 is facilitated by the fact that when the transmissions to the individual axles or groups of axles are braked, the two turbine shafts 3 and 4 will, if there is only a slight difference in the dimensions of the driving wheels of the vehicle, allow a relatively slight rotation of the teeth relative to each other before the clutch sleeves are moved from the intermediate position into engagement with the jaws of the gears so that a standing of the teeth upon each other for any material length of time will be avoided.

If the synchronizing device according to Fig. 2 is not constructed with a transmission ratio of 1:1 and 1:2 respectively, but with transmission ratios which deviate up to 10% from the above-mentioned values, the shifting sleeve will, during the synchronization, differ a little in speed of rotation from the gear to be clutched. In such an instance, the jaws of the sleeve may run ahead or behind, up to 10%, with regard to the jaws of the gear, depending upon which of the two transmissions is to be shifted. In both instances, this will materially facilitate the engagement of the jaws of the shifting sleeve with the jaws of the respective gear. Experience with transmissions made according to the present invention has shown that the jaws can be engaged with each other absolutely without shock.

*Embodiment of Fig. 2*

While the embodiment of Fig. 1 concerns a two speed transmission, the embodiment of Fig. 2 represents a shiftable three speed transmission. In other words, the gear pairs of Fig. 1 are augmented by the gear pairs 23, 24 and 25, 26. The double acting clutch sleeves 15 and 16 of Fig. 1 are, according to Fig. 2, replaced by single acting clutch sleeves 27, 28, 29 and 30, 31, 32. Again assuming a speed step of 1:2, the speed ratios will be 1:2:4. The two synchronizing devices which have the same reference numerals as those of Fig. 1 also, in this instance, have the ratios 1:1 and 1:2. Also with this arrangement, only two synchronizing devices are required.

*Operation of second embodiment*

The shifting from the first speed to the second speed is effected in the same manner as described under the heading of "Operation of first embodiment."

More specifically, it may be assumed that the clutch sleeve 29 is in engagement with the gear 23 and the clutch sleeve 32 is in engagement with the gear 25 and power is transmitted from the converters 1 and 2 so that the entire arrangement is driving in first speed. If now the arrangement is to be shifted into second speed, the power transmission from converter 2 to shaft 4 is interrupted. Thereupon, the clutch sleeve 32 is disengaged from the corresponding clutches on gear 25. Thereafter, clutch 21 is moved into its effective position so that now shaft 4 rotates at half the speed of shaft 3, thereby making it possible to bring the clutch sleeve 31 into engagement with the clutches of gear 9. As soon as this has been effected, clutch 21 is again moved into its ineffective position and power transmission from converter 2 to shaft 4 is reestablished. Immediately thereafter, power transmission from converter 1 to shaft 3 is interrupted and clutch 29 is disengaged from the corresponding clutches of gear 23. Now clutch 22 is moved into effective position so that shaft 3 will be rotated at the same speed as shaft 4. This makes it possible to shift the clutch sleeve 28 into engagement with the corresponding clutch jaws of gear 5. Immediately after this shifting operation has been effected, clutch 22 will be returned to its ineffective position and power transmission from converter 1 to shaft 3 is reestablished.

If after further increase of the speed it is desired to shift from the second to the third speed, the shifting operation is again effected in the same sequence as is observed when shifting from the first to the second speed. In other words, the power transmission of converter 2 to shaft 4 is again interrupted. Thereupon clutch sleeve 31 is detached from the clutch jaws of gear 9 and is moved into its ineffective position. Thereafter clutch 21 is moved into its effective position so that now through the chain connection with sprocket 19 and sprocket 18, shaft 4 will rotate at half the speed of shaft 3. This makes it possible to bring the clutch sleeve 30 into engagement with the clutch jaws of gear 11. As soon as this has been effected, clutch 21 is returned to its ineffective position and the power transmission from converter 2 to shaft 4 is reestablished. Thereupon the power transmission from converter 1 to shaft 3 is interrupted and clutch sleeve 28 is disengaged from the clutch jaws of gear 5 and returned to its ineffective position. Clutch 22 is then moved into its effective position and through sprockets 20 and 17 and the interconnecting chain, will move shaft 3 at the same speed as shaft 4. This makes it possible to bring clutch sleeve 27 into engagement with the clutch jaws of gear 7. As soon as this has been effected, clutch 22 is returned to its inoperative position, whereupon power transmission from converter 1 to shaft 3 is reestablished. The arrangement is now operating in third speed. The shifting-down operations are naturally effected in the reverse manner.

Instead of the synchronizing devices shown in Figs. 1 and 2, other devices such as the differential transmission shown in Fig. 3 may be used. Fig. 3 merely shows the ends of the turbine shafts 3 and 4, since the remainder of the arrangement may be the same as those shown in Figs. 1 and 2.

According to Fig. 3, a sprocket 33 is rigidly connected to the turbine shaft 3. This sprocket wheel 33 is drivingly connected by means of a chain with a ring gear 35 of the same size, rigidly connected to and mounted on the casing 34 of a differential gear system. The differential gear system consists of the sun-wheel 36 rigidly connected to the shaft 4 and the sun-wheel 38 rigidly connected to the hollow shaft 37. The differential gear system furthermore comprises planetary gears 39 and 40. A brake 41 is provided which is adapted to act upon the hollow shaft 37, while a clutch 42 is provided for selectively connecting the shaft 4 with, or disconnecting the same from the hollow shaft 37. The transmission ratios are again selected so that by means of the synchronizing transmission shown in Fig. 3 from the shaft 4 to the shaft 3, a ratio of 1:1 or 1:2 may be obtained. If the clutch 42 is made effective, a connection is established between shaft 3 and shaft 4 at a transmission ratio of 1:1. If, on the other hand, the brake 41 is made effective, the transmission ratio is 1:2. In this instance, the brake 41 and the clutch 42 form the synchronizing devices.

The invention is also applicable to transmissions in which the axle group pertaining to the first converter during forward drive is exchanged for rearward drive with the axle group pertaining to the second converter. The invention is also applicable when between the first and second speed, the converters and axles are exchanged in analogous manner.

While in the embodiments described above, the shifting operation is effected on the turbine shaft, it will be clear that the arrangement may be changed so that the gears are rigidly connected to the turbine shafts and are freely rotatably mounted on the output shafts, in which instance, the shifting operation occurs on the output shafts (see Fig. 5). Furthermore, the clutch sleeves may be split up so that one shifting operation occurs on the turbine shaft, and the other shifting operation occurs on the output shaft.

It will also be obvious that the cone-shaped clutches shown in the drawing may be replaced by multiple disc clutches or other synchronizing devices which, prior to the actual engagement of the shifting elements with the stationary gears, will facilitate the engagement therewith. In order to avoid any errors in the shifting operations, preferably the two clutch sleeves 15 and 16 are locked relative to each other in such a manner that one shifting clutch can be moved only when the other shifting clutch is in complete engagement, and vice versa. For this purpose there is provided a part 61, which is swingable about a bolt 62. The nose 63 of the part 61 may engage in the notches 58, 59 of a cam 55. The nose 64 of the part 61 may engage in the notches 60, 71 of a cam 56. The notches 58, 59 correspond to the position of the clutch sleeve 16, when this is completely engaged with the gear 9, respectively 11. The notches 60, 71 correspond to the position of the clutch sleeve 15, when this is completely engaged with the gear 5 respectively 7. Only then, when the nose 64 is completely engaged with the notches 60 respectively 71 the cam 55 may be rotated and vice versa. The cam 55 is rigidly connected to the shifting shaft 65. Rigidly connected to the shifting shaft 65 is the forked lever 67, which is adapted to shift the clutch sleeve 16 by means of a sliding piece 66. The cam 56 is rigidly connected to the shifting shaft 68. Rigidly connected to the shifting shaft 68 is the forked lever 70, which is adapted to shift the clutch sleeve 15 by means of a sliding piece 69.

In Figure 5 there is shown a modification similar to the arrangement of Figure 1, except that clutch sleeve 15 is disposed between gears 6 and 8 for selective engagement therewith while clutch sleeve 16 is disposd between gears 10 and 12 for selective engagement therewith. Also in Figure 5, gears 5 and 7 are keyed to shaft 3 while gears 9 and 11 are keyed to shaft 4 while gears 6, 8, 10 and 12 are rotatable on their respective shafts.

It is, of course, understood that the present invention is by no means limited to the particular constructions shown in the drawings, but also comprises any modifications within the scope of the appended claims.

What we claim is:

1. A multiple speed transmission comprising in combination, a first and a second transmission unit, each of said units comprising an input shaft, an output shaft, and a clutch operatively interposed between said input and said output shaft for selectively bringing about a speed change in the respective units, two hydraulic power transmission means respectively associated with said units for conveying power thereto, and additional transmission means including shiftable clutch means arranged for selectively drivingly interconnecting said first and said second input shafts.

2. A multiple speed transmission comprising in combination, two transmission units of substantially equal transmission ratio, each of said units including a hydraulic converter and a mechanical transmission of variable speed arranged to receive power from said converter, driving means common to said converters for supplying driving power thereto, and additional transmission means of variable transmission ratio arranged for selectively drivingly interconnecting said mechanical transmissions.

3. A multiple speed transmission according to claim 2 in which said hydraulic converters include pumping wheels having adjustable pumping blades.

4. A multiple speed transmission comprising in combination, two transmission units of substantially equal transmission ratio, each of said units including a hydraulic converter and a mechanical transmission of variable speed having its input shaft arranged to receive power from said converter, driving means common to said converters for supplying driving power thereto, and additional transmission means of variable transmission ratio arranged for selectively drivingly interconnecting said mechanical transmissions, said additional transmission means including a first pair of transmission members respectively rigidly connected to said input shafts, and a second pair of transmission members respectively freely rotatably mounted on said input shafts, said additional transmission means also including means for respectively effecting driving connections between the members of said first pair and the members of said second pair, and a pair of clutch means respectively drivingly connected with said input shafts and separably operable selectively to engage the adjacent member of said second pair of members, thereby drivingly connecting the same with the respective input shaft.

5. A multiple speed transmission comprising in combination, two transmission units of substantially equal transmission ratio, each of said units including a hydraulic converter and a mechanical transmission of variable speed having its input shaft arranged to receive power from said converter, driving means common to said converters for supplying driving power thereto, and additional transmission means of variable transmission ratio arranged for selectively drivingly interconnecting said mechanical transmissions, said additional transmission means including a first transmission member, drivingly connected to one of said input shafts, and a differential transmission associated with the other input shaft, said differential transmission comprising a casing freely rotatably mounted on said other input shaft and provided with a ring gear drivingly connected with said first transmission member so as to yield a transmission ratio of 1:1, said differential transmission also comprising a first sun gear drivingly connected with said other input shaft and a second sun gear freely rotatable relative to said other input shaft, clutch means drivingly connected to said other input shaft, and operable selectively to effect driving connection between said other input shaft and said second sun gear, and means operable selectively for holding said second sun gear stationary so as to prevent rotation thereof to thereby establish between said input shafts another transmission ratio corresponding to a predetermined speed step.

6. A multiple speed transmission according to claim 5, in which the said means associated with the second sun gear and operable selectively to hold said second sun gear stationary comprises a brake having one part fixed to the second sun gear and another part which is stationary.

7. In combination in a multiple speed transmission, a first and a second transmission unit, each of said units comprising an input shaft and an output shaft, a hydraulic twin transmission arranged for driving connection with said input shafts, first clutch means operatively interposed between the input shaft and output shaft of said first transmission unit and operable to bring about a speed change in said first transmission unit, second clutch means operatively interposed between the input shaft and output shaft of said second transmission unit, means operatively connected with said first and second clutch means and arranged to allow operation of said first clutch means only when said second clutch means occupies a predetermined position and vice-versa, and additional transmission means including shiftable clutch members arranged for selectively drivingly interconnecting said first and said second input shafts.

8. A multiple speed transmission comprising in combination, two transmission units of substantially equal transmission ratio, each of said units including a hydraulic converter and a mechanical transmission of variable speed having its input shaft arranged to receive power from said converter, driving means common to said converters for supplying driving power thereto, and additional transmission means including a four-element differential having one element connected to one of said input shafts, and a second element connected to the other of the input shafts, and means selectively operable for connecting a third element of said differential transmission with said one input shaft, for holding the said third element stationary, or for releasing the said third element for free rotation.

9. In combination; a pair of multiple speed transmissions having output shafts adapted for connection to a common load, input shafts for said transmissions, gearing between the input and output shafts of the transmissions and clutch means for each transmission for interconnecting each input shaft with the pertaining output shaft through said gearing at a plurality of driving ratios, and auxiliary variable speed transmission means for drivingly connecting said input shafts during shifting movements of said clutch means for synchronizing the input shafts with the parts to which they are to be connected by the shifting of the clutch means, each said input shaft being adapted for being disconnected from the source of driving power thereto during the said shifting of the pertaining one of said clutch means.

10. A multiple speed transmission according to claim 4 in which said additional transmission means are adapted to effect driving connections between said input shafts with two transmission ratios, one corresponding to the step between two adjacent speeds, and the other corresponding to the value of 1:1.

11. A multiple speed transmission according to claim 4 in which said additional transmission means are adapted to effect driving connections between said input shafts with two transmission ratios deviating up to 10% from ratios corresponding to the step between two adjacent speeds, and the value of 1:1.

ERNST LAMMERZ.
HEINRICH HERRMANN.

References Cited in the file of this patent
UNITED STATES PATENTS

| Number | Name | Date |
| --- | --- | --- |
| Re. 20,487 | Schmidt | Aug. 24, 1937 |
| 1,130,054 | Barnum | Mar. 2, 1915 |
| 1,827,348 | Bing | Oct. 13, 1931 |
| 2,063,471 | Stedefeld | Dec. 8, 1936 |
| 2,618,988 | Woydt | Nov. 25, 1952 |